(12) United States Patent
Takahashi

(10) Patent No.: US 7,918,256 B2
(45) Date of Patent: Apr. 5, 2011

(54) HEAVY DUTY TIRE HAVING GROUND CONTACTING FACE AT 70% AND 100% MAXIMUM TIRE LOAD

(75) Inventor: Shingo Takahashi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1048 days.

(21) Appl. No.: 11/646,249

(22) Filed: Dec. 28, 2006

(65) Prior Publication Data
US 2007/0151643 A1   Jul. 5, 2007

(30) Foreign Application Priority Data

Dec. 29, 2005   (JP) ................... 2005-380615

(51) Int. Cl.
*B60C 3/04* (2006.01)
*B60C 11/00* (2006.01)
(52) U.S. Cl. ............... 152/209.1; 152/209.18; 152/454; 152/902
(58) Field of Classification Search ............ 152/209.1, 152/209.18, 902, 454
See application file for complete search history.

(56) References Cited

U.S. PATENT DOCUMENTS

| | | | |
|---|---|---|---|
| 4,955,416 A * | 9/1990 | Takeuchi et al. | 152/454 |
| 6,443,199 B1 * | 9/2002 | Scarpitti et al. | 152/209.1 |
| 6,564,839 B1 * | 5/2003 | Manne et al. | 152/209.14 |
| 2004/0079460 A1 * | 4/2004 | Maruoka et al. | 152/209.18 |
| 2005/0016656 A1 * | 1/2005 | Kuroki et al. | 152/548 |
| 2005/0092412 A1 * | 5/2005 | Iizuka | 152/209.18 |
| 2006/0102267 A1 * | 5/2006 | Takahashi et al. | 152/209.18 |

FOREIGN PATENT DOCUMENTS

| JP | 2000-225813 | * | 8/2000 |
|---|---|---|---|
| JP | 2004-51083 A | | 2/2004 |

OTHER PUBLICATIONS

VDI Berichte (VDI Report 788) by Verein Deutscher Ingenieure (Union German Engineers), published Sep. 1989, Hannover, Germany, pp. 179, 189 (with English translation of p. 189).*

* cited by examiner

*Primary Examiner* — Steven D Maki
(74) *Attorney, Agent, or Firm* — Birch, Stewart, Kolasch & Birch, LLP

(57) ABSTRACT

A heavy-duty tire having a tread portion improved in the shoulder wear is disclosed. Under the maximum load condition[W100], the tread portion has a ground contacting face G[W100] having circumferential lengths L97[W100] and L70[W100] at specific axial positions. Under the 70% load condition[W70], the tread portion has a ground contacting face G[W70] having lengths L97[W70] and L70[W70] at specific axial positions. The lengths L70[W100], L97[W100], L70[W70] and L97[W70] satisfy specific conditions: 0.95<L70[W100]/L97[W100]<1.05; and 1.03<L70[W70]/L97[W70]<1.20.

5 Claims, 8 Drawing Sheets

Comparative tire 1

HEAVY DUTY TIRE HAVING GROUND CONTACTING FACE AT 70% AND 100% MAXIMUM TIRE LOAD

The present invention relates to a heavy-duty tire, more particularly to a pneumatic tire for trucks and buses improved in uneven wear.

In the heavy-duty tires, especially those mounted on steered wheels, uneven wear in the tread shoulder regions so called shoulder wear is liable to occur.

In order to prevent such shoulder wear, commonly widely used provisions are: to increase the rigidity of tread elements in the tread shoulder regions; to increase the width of a tread reinforcing belt to reinforce the tread shoulder regions; and to provide weak tread elements in the tread shoulder regions to concentrate wear on the weak tread elements only.

In the case of the method to increase the belt width, when the used tire is retreaded in order to reuse, the belt edges are very liable to be injured during removing the worn tread rubber. If injured, it becomes impossible to retread the tire.

In the case of the method to increase the rigidity of the tread elements in the tread shoulder regions, another uneven wear so called center wear occurs in the tread crown region.

In the case of the method to provide weak tread elements in the tread shoulder regions, another problem of cracks and tear-off of the weak elements is very liable to occur, and if occurred, wear can not concentrate on the weak tread elements only and spreads to the shoulder wear.

It is therefore, an object of the present invention to provide a heavy-duty tire, in which shoulder wear can be effectively prevented over a long period of time without causing the above-mentioned other problems.

According to the present invention, a heavy-duty tire comprises a tread portion, a pair of sidewall portions, a pair of bead portions, a carcass extending between the bead portions through the tread portion and sidewall portions, and a belt disposed radially outside the carcass in the tread portion, wherein under the maximum load condition[W100], the tread portion has a ground contacting face having a length L97 [W100] and a length L70[W100], under the 70% load condition[W70], the tread portion has a ground contacting face having a length L97[W70] and a length L70[W70], and the lengths L70[W100], L97[W100], L70[W70] and L97 [W70] satisfy the following conditions:

$0.95 < L70[W100]/L97[W100] < 1.05$, and $1.03 < L70[W70]/L97[W70] < 1.20$.

DEFINITIONS

Maximum Load Condition[W100]

The maximum load condition is such that the tire is mounted on a standard wheel rim and inflate to a maximum air pressure and loaded with a maximum tire load.

70% Load Condition [W70]

The 70% load condition is such that the tire is mounted on the standard wheel rim and inflate to the maximum air pressure and loaded with 70% of the maximum tire load.

Standard Wheel

The standard wheel rim is a wheel rim officially approved for the tire by standard organization, i.e. JATMA (Japan and Asia), T&RA (North America), ETRTO (Europe), STRO (Scandinavia) and the like. For example, the standard wheel rim is the "standard rim" specified in JATMA, the "Measuring Rim" in ETRTO, the "Design Rim" in TRA or the like.

Maximum Air Pressure and Maximum Tire Load

The maximum air pressure and the maximum tire load are those specified for the tire by the same organization in the Air-pressure/Maximum-load Table or similar list. For example, the maximum air pressure is the "maximum air pressure" in JATMA, the "Inflation Pressure" in ETRTO, the maximum pressure given in the "Tire Load Limits at various Cold Inflation Pressures" table in TRA or the like. The maximum tire load is the "maximum load capacity" in JATMA, the "Load Capacity" in ETRTO, the maximum value given in the above-mentioned table in TRA or the like.

Ground Contacting Width TW

The ground contacting width is the axial distance TW between the axially outermost edges (tread edges E) of the ground contacting face of the tread portion under the specified load condition [W100],[W70] of the tire.

Position P70

The position P70 is an axial position spaced apart axially outwards from the tire equator C by an axial distance (A) which is one half of 70% of the ground contacting width TW under the specified load condition [W100], [W70] of the tire. (namely, A=0.35 TW)

Position P97

The position P97 is an axial position spaced apart axially outwards from the tire equator C by an axial distance (B) which is one half of 97% of the ground contacting width TW under the specified load condition [W100],[W70] of the tire. (namely, B=0.485 TW)

Length L70[W100]

The length L70[W100] is the circumferential length of the ground contacting face of the tire under the maximum load condition [W100] which is measured at the axial position P70.

Length L97[W100]

The length L97[W100] is the circumferential length of the ground contacting face of the tire under the maximum load condition [W100] which is measured at the axial position P97.

Length L70[W70]

The length L70[W70] is the circumferential length of the ground contacting face of the tire under the 70% load condition [W70] which is measured at the axial position P70.

Length L97[W70]

The length L97[W70] is the circumferential length of the ground contacting face of the tire under the 70% load condition [W70] which is measured at the axial position P97.

Maximum-Pressure Unloaded Condition

The maximum-pressure unloaded condition is such that the tire is mounted on the standard wheel rim and inflated to the maximum pressure, but loaded with no tire load.

50%-Pressure Unloaded Condition

The 50%-pressure unloaded condition is such that the tire is mounted on the standard wheel rim and inflated to 50% of the maximum pressure, but loaded with no tire load.

Embodiments of the present invention will now be described in detail in conjunction with the accompanying drawings.

Figure 1:
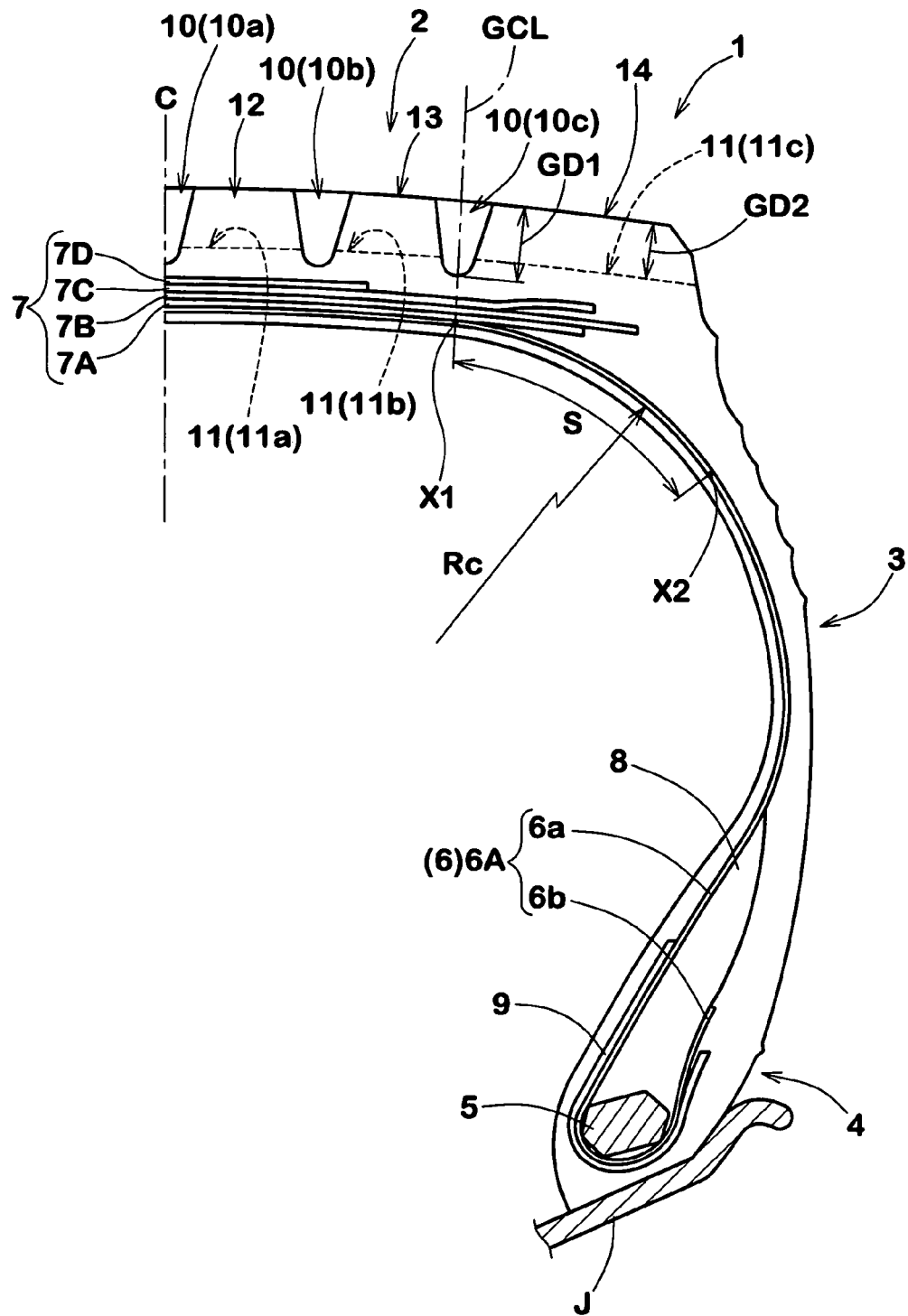
FIG. 1 is a cross sectional view of a heavy-duty tire according to the present invention under the maximum-pressure unloaded condition.

In the drawings, the heavy-duty tire 1 according to the present invention comprises: a tread portion 2; a pair of axially spaced bead portions 4 each with a bead core 5 therein; a pair of sidewall portions 3 extending between the tread edges and the bead portions; a carcass 6 extending between the bead portions 4; and a belt 7 disposed radially outside the carcass in the tread portion 2.

The carcass 6 is composed of at least one ply 6A of cords arranged radially at an angle in the range of from 80 to 90 degrees with respect to the tire equator C, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this embodiment, the carcass 6 is composed of the single ply 6A of steel cords arranged radially at an angle of 90 degrees with respect to the tire equator C.

The bead portions 4 are each provided between the main portion 6a and turned up portion 6b of the carcass ply 6A with a bead apex 8. The bead apex 8 is made of hard rubber extending radially outwards from the radially outside of the bead core 5, while tapering towards its radially outer end. Further, the bead portions 4 are each provided with a bead reinforcing layer 9 made of steel cords and turned around the bead core 5 into a U-shaped cross sectional shape extending along the carcass.

The belt 7 is composed of at least three plies, in this example four plies, of steel cords: the radial innermost first ply 7A made of parallel cords laid at an angle of from 45 to 75 degrees with respect to the tire equator C; and radially outer second, third and fourth plies 7B, 7C and 7D each made of parallel cords laid at an angle of 10 to 35 degrees with respect to the tire equator C.

Figure 2:
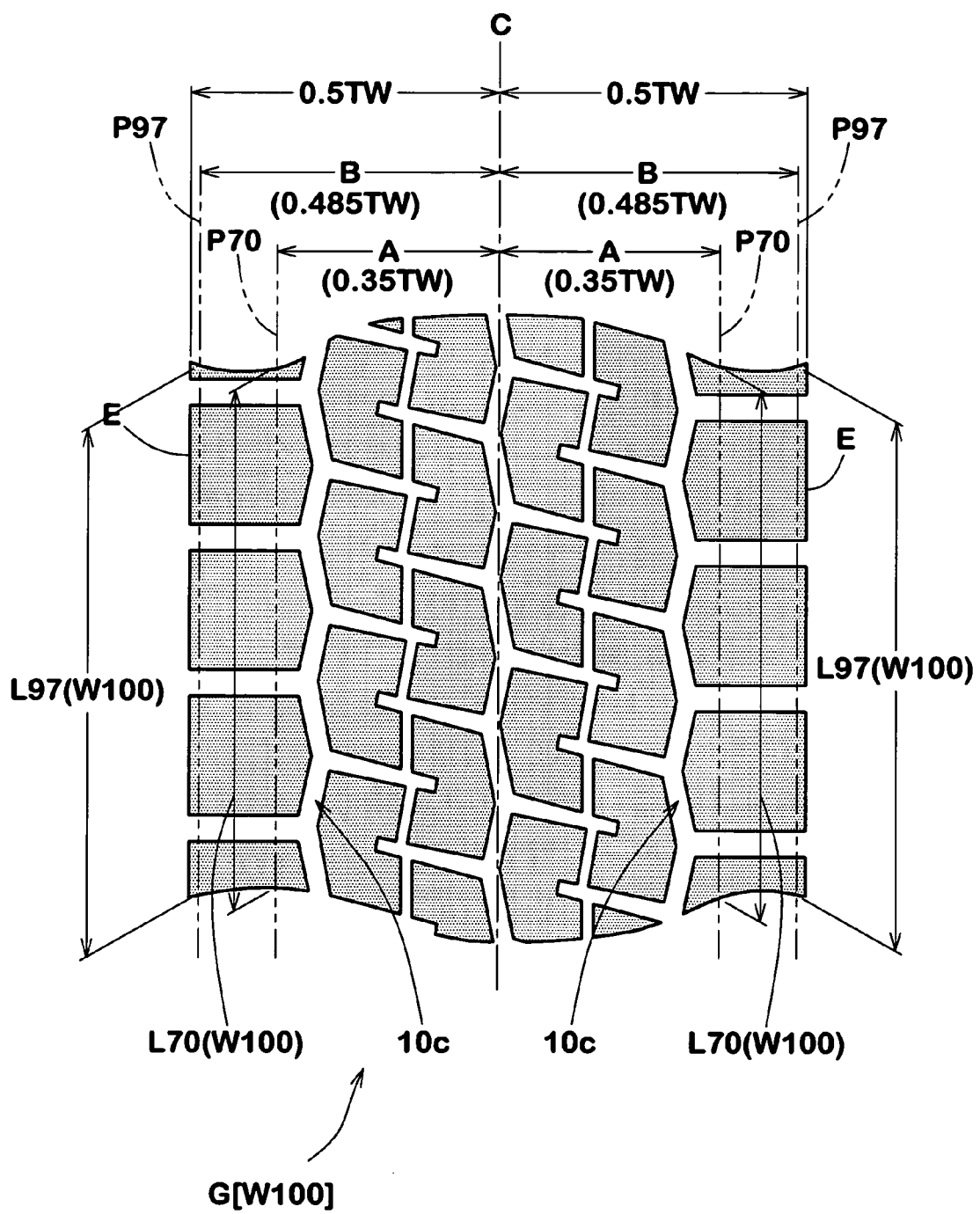
FIG. 2 is a foot print of the tire showing the ground contacting face under the maximum load condition[W100].

When the tire 1 is under the maximum load condition [W100] and the camber angle of the tire is zero, the tire 1 has a ground contacting face G[W100] (hereinafter the "heavy-loading ground contacting face G[W100]"), as shown in FIG. 2, wherein the ratio L70[W100]/L97[W100] of the length L70[W100] to the length L97[W100] is more than 0.95, preferably more than 0.98, but less than 1.05, preferably less than 1.02. Most preferably, the ratio is 1.0. If the ratio L70[W100]/L97[W100] is less than 0.95, the ground contacting length at the position P70 becomes excessively small, and as a result, the ground pressure in this position is excessively decreased to increase slip on the road surface, and accordingly, wear increase. If the ratio L70[W100]/L97[W100] is more than 1.05, the ground contacting length at the position P97 becomes excessively small, and the wear increases in this position.

Figure 3:
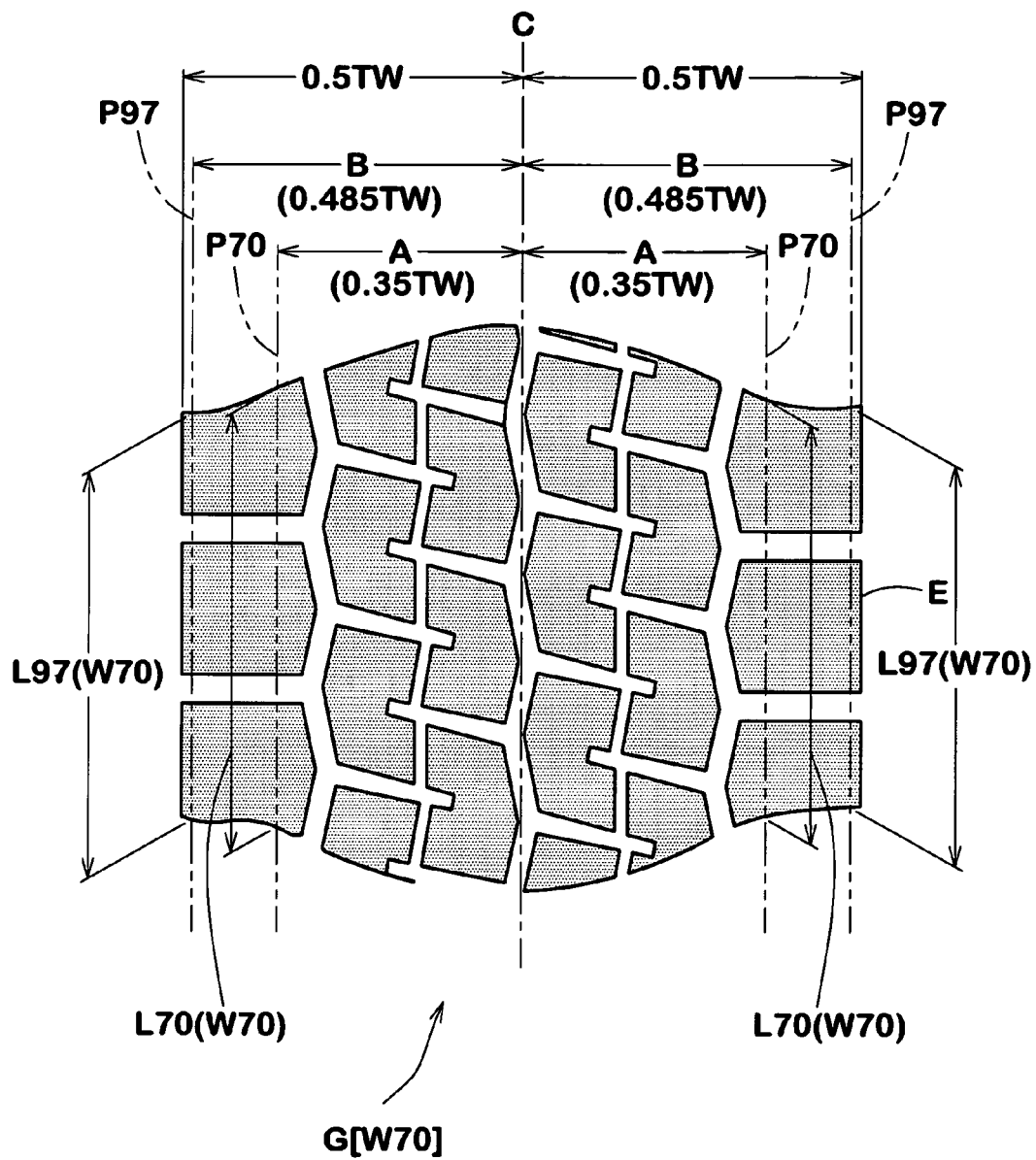
FIG. 3 is a foot print of the tire showing the ground contacting face under the 70% pressure condition[W70].

Further, when the tire 1 is under the 70% load condition and the camber angle is zero, the tire has a ground contacting face G[W70] (hereinafter the "light-loading ground contacting face G[W70]") as shown in FIG. 3, wherein the ratio L70 [W70]/L97[W70] of the length L70[W70] to the length L97 [W70] is more than 1.03, but less than 1.20, preferably not more than 1.15.

In order to further decrease the change in the ground contacting shape between the maximum load and 70% load, the difference L70[W70]/L97[W70]−L70[W100]/L97[W100] is preferably set in a range of more than 0.05, but less than 0.23, more preferably less than 0.15.

In this embodiment, the ground contacting width TW[W70] under the 70% load condition is the same as the ground contacting width TW[W100] under the maximum load condition. Accordingly, the steering stability can be maintained even under the 70% load condition.

Although trial-and-error testing is inherent, the ground contacting faces G[W100] and G[W70] satisfying the above-mentioned conditions can be obtained in several ways, for example: to change the profile of the tread portion 2 by changing the profile of the tire vulcanizing mold; to change the profile of the carcass 6 by changing the thicknesses of rubber components, e.g. tread rubber, sidewall rubber and the like disposed in the tire shoulder portion (this is the simple and easiest way because it is not necessary to change the costly vulcanizing mold); to change the profile of the belt; to change the widths of the belt plies and the like. These methods can be employed alone or in combination.

Figure 4:
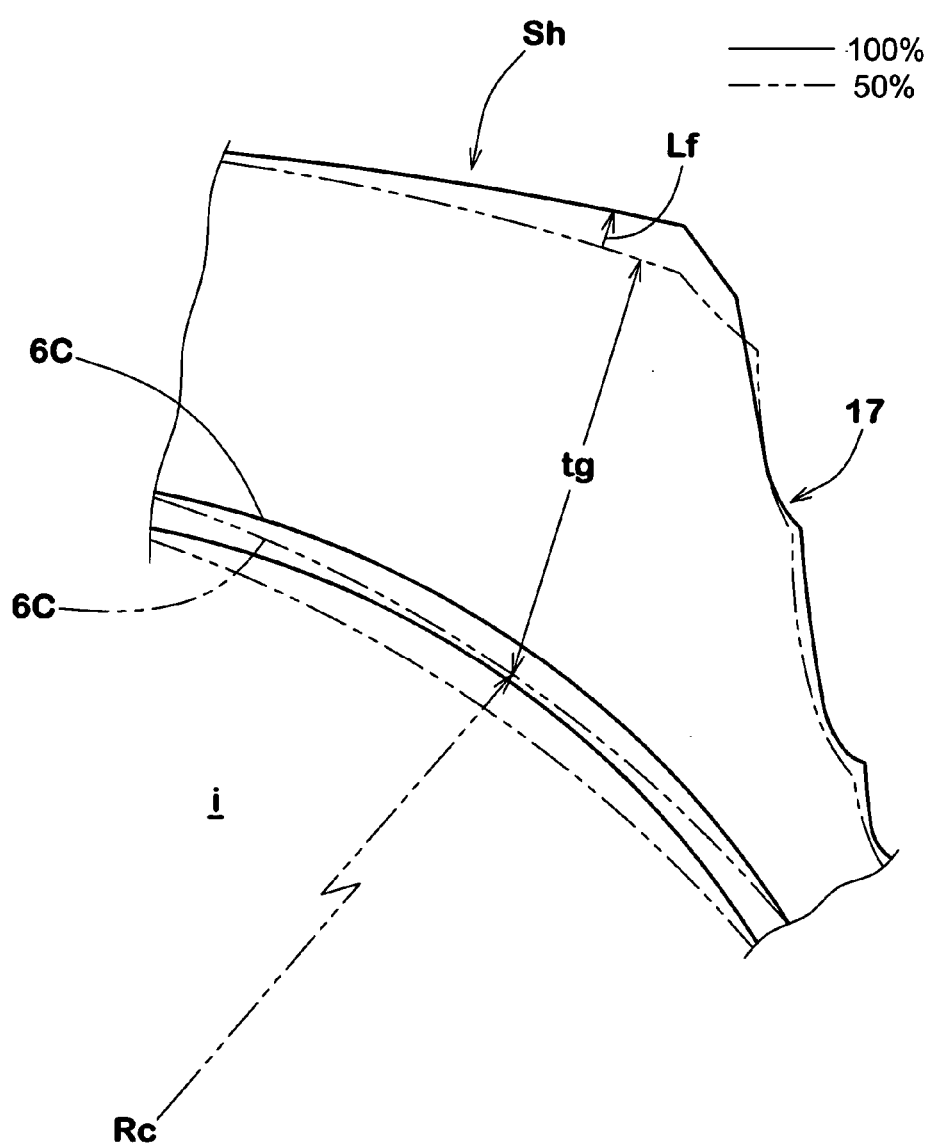
FIG. 4 is an enlarged cross sectional view of the shoulder portion of the heavy-duty tire.

FIG. 4 shows such a method, wherein the full line shows the shoulder portion of the tire 1 in the maximally-inflated unloaded condition, and the two-dot-dashed line shows the shoulder portion of the tire 1 in the 50%-pressure unloaded condition. In this method, without changing the profile of the tire vulcanizing mold, the carcass profile is changed by increasing the rubber thickness tg in the tread shoulder region Sh and the buttress portion 17 (namely, the radially outermost part of the sidewall), the profile of the main portion 6a of the carcass 6 (the profile of the thickness center line 6C of the carcass cords) in the 50%-pressure unloaded condition is provided with an increased radius Rc of curvature (more flat part) locally in the tread shoulder region Sh and the buttress portion 17. Therefore, the carcass cord center line 6C in the 50%-pressure unloaded condition is positioned inside the carcass cord center line 6C in the maximally-inflated unloaded condition.

As a result, the radius RC of curvature becomes decreased as the tire pressure increases to the maximum pressure, and accordingly, the tread shoulder region Sh is pushed radially outwardly by a small amount Lf (exaggerated in FIG. 4), and the above-mentioned heavy-loading ground contacting face G[W100] and light-loading ground contacting face G[W70] can be obtained.

In the 50%-pressure unloaded condition, it is preferable that, as shown in FIG. 1, a region s between points X1 and X2 has the single radius Rc of curvature. The radius Rc is preferably not less than 60 mm, more preferably not less than 85 mm, but not more than 130 mm, more preferably not more than 115 mm. The point X1 is the intersection X1 of the center line GCL of the axially outermost circumferential groove 10c with the carcass cord, and the point X2 is axially outwards of the point X1 by a length of from 40 to 70 mm along the carcass cord centerline.

Figure 5:
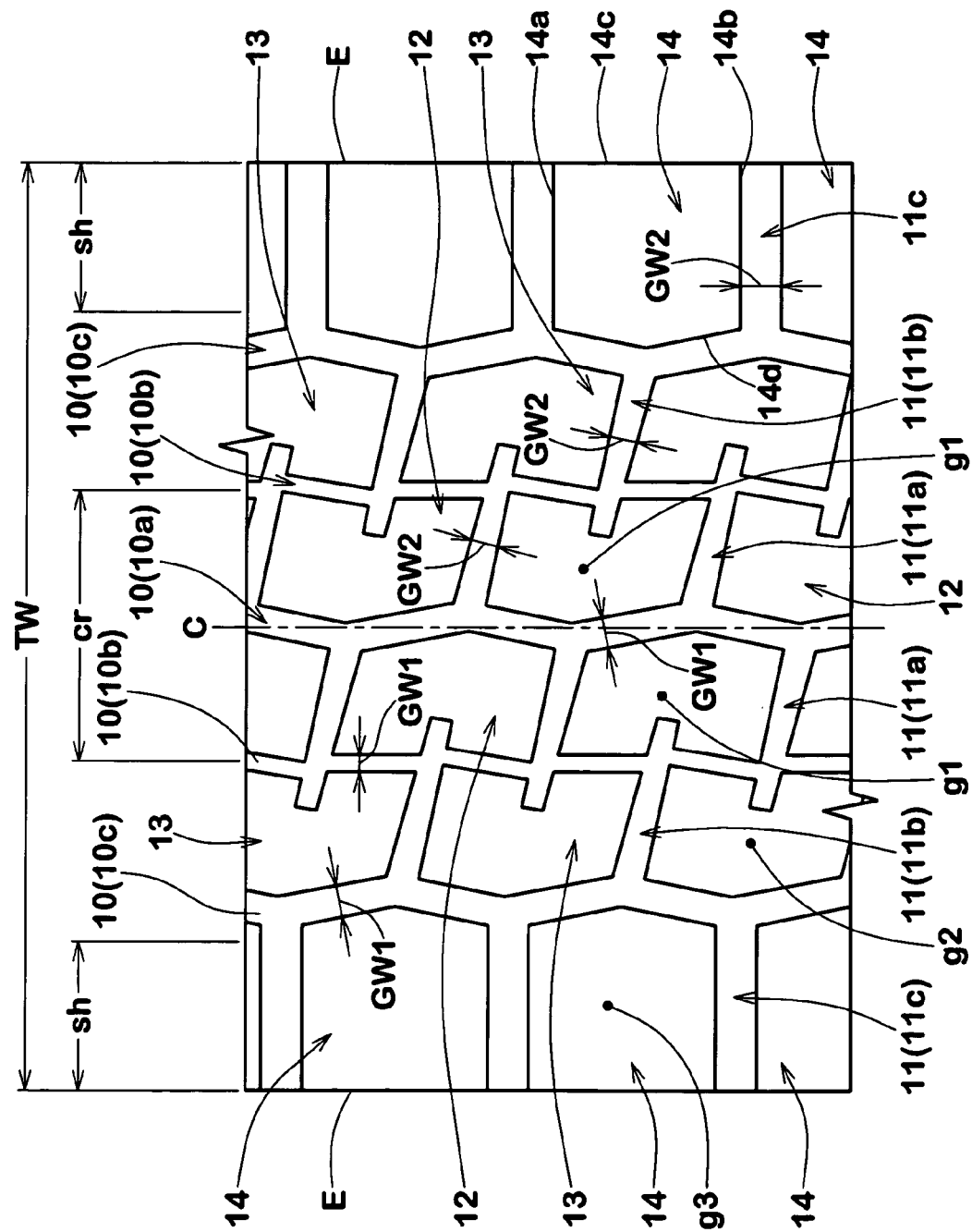
FIG. 5 is a developed view of the tread portion of the heavy-duty tire showing an example of the tread pattern.

In this embodiment, as show in FIG. 5, the tread portion 2 is provided with a plurality of continuous circumferential grooves 10 which are a central groove 10a disposed on the tire equator C, a middle groove 10b disposed on each side of the tire equator C, and an outermost groove 10c disposed axially outside the middle circumferential groove 10b.

Each of the circumferential grooves 10 is slightly zigzaged, but a straight configuration, wavy configurations and the like may be employed if desired.

As to the width GW1 and depth GD1 of each circumferential groove 10, if too small, it is difficult to obtain sufficient drainage performance. If too large, the wear resistance and steering stability are liable to be deteriorated. Therefore, the groove width GW1 is preferably not less than 3.2%, more preferably not less than 4.3%, but not more than 5.5%, more preferably not more than 4.5% of the ground contacting width TW under the maximum load condition, and the groove depth GD1 is preferably not less than 5.5%, more preferably not less than 6.5%, but not more than 8.0%, more preferably not more than 7.0% of the ground contacting width TW under the maximum load condition.

The tread portion 2 is further provided with: a plurality of first axial grooves 11a extending between each of the middle circumferential grooves 10b and the central circumferential groove 10a; a plurality of second axial grooves 11b extending between the middle circumferential grooves 10b and the outermost circumferential grooves 10c; and a plurality of third axial grooves 11c extending between the outermost circumferential grooves 10c and the tread edges E.

As to the width GW2 and depth GD2 of each axial groove 11, if too small, it is difficult to obtain sufficient drainage performance. If too large, the steering stability are liable to be deteriorated.

Therefore, the groove width GW2 is preferably not less than 2.2%, more preferably not less than 3.2%, but not more than 4.5%, more preferably not more than 3.5% of the tread ground contacting width TW under the maximum load condition, and the groove depth GD2 is preferably not less than 4.8%, more preferably not less than 5.8%, but not more than 7.8%, more preferably not more than 6.8% of the tread ground contacting width TW under the maximum load condition.

By the circumferential grooves 10 and axial grooves 11, the tread portion 2 is divided into: crown blocks 12 between the central circumferential groove 10a and middle circumferential grooves 10b; middle blocks 13 between the middle circumferential grooves 10b and outer circumferential grooves 10c; and shoulder blocks 14 between the outermost circumferential grooves 10c and tread edges E.

In this example, the axial grooves 11a and 11b are inclined at small angles, for example 5 to 15 degrees with respect to the tire axial direction.

The third axial grooves 11c are each extended in substantially parallel with the tire axial direction from one of the axially outwardly protruding points K of the zigzag of the outermost circumferential groove 10c to the tread edge E, whereby the shoulder block 14 has two opposing sides 14a and 14b extending substantially parallel with the tire axial direction, a side 14b extending in parallel with the tire circumferential direction along the tread edge E, and a side 14d bent convexly axially inward. Such shoulder blocks 14 are rigid and have a high resistant to the shoulder wear.

As explained above, by arranging the ground contacting faces G[W100] and G[W70], the wear in the tread shoulder portion can be decreased.

It is therefore, preferable that, in order to uniform tread wear, the wear in the tread center portion is reduced by optimizing the ratio (Gs/Gc) of the circumferential rigidity Gs of the shoulder blocks 14 to the circumferential rigidity Gc of the crown blocks 12. Firstly, the crown blocks 12 and shoulder blocks 14 are arranged such that: the ground contacting top surface of each of the crown blocks 12 has the centroid g1 within the tread crown region Cr; the ground contacting top surface of each of the shoulder blocks 14 has the centroid g3 within the tread shoulder region Sh; and the ground contacting top surface of each of the middle blocks 13 has the centroid g2 within the middle region. In the maximally-inflated unloaded condition, a crown region Cr is defined as being centered on the tire equator C and having a width of 60% of the tread ground contacting width TW; a shoulder region Sh is defined as extending axially inwardly from each of the tread edges E by 15% of the tread ground contacting width TW; and a middle region is defined as the region between each of the shoulder regions Sh and the crown region Cr.

Then, the circumferential rigidity ratio (Gs/Gc) is set in a rage of not less than 1.50, preferably not less than 1.65, but not more than 1.90, preferably not more than 1.80. If the shoulder block rigidity Gs is less than 1.50 times the crown block rigidity Gc, the shoulder blocks 14 becomes liable to slip in comparison with the crown blocks 12, and the shoulder block wear becomes larger than the crown block wear. If the shoulder block rigidity Gs is more than 1.90 times the crown block rigidity Gc, the crown blocks 12 becomes liable to slip when compared with the shoulder blocks 14, and the crown block wear becomes larger than the shoulder block wear.

In this embodiment, the shoulder blocks have substantially same configurations, and accordingly, they have substantially same circumferential rigidities Gs. Further, the crown blocks have substantially same configurations, and accordingly, they have substantially same circumferential rigidities Gc.

Here, the meaning of the term "substantially same" is as follows. AS well known in the tire art, in order to reduce noise generated from the tire during running, a so called variable pitching method is widely employed in arranging the tread elements to lessen their periodicity. As a result, there is a possibility that the shape of a block is slightly elongated or shrank in the tire circumferential direction and the circumferential rigidity has accordingly a variation of about plus/minus 15% (Max.) from the average. Such a variation is considered to be substantially same. When the circumferential rigidity Gs, Gc has such a variation, the average value thereof is used instead.

Figure 6:
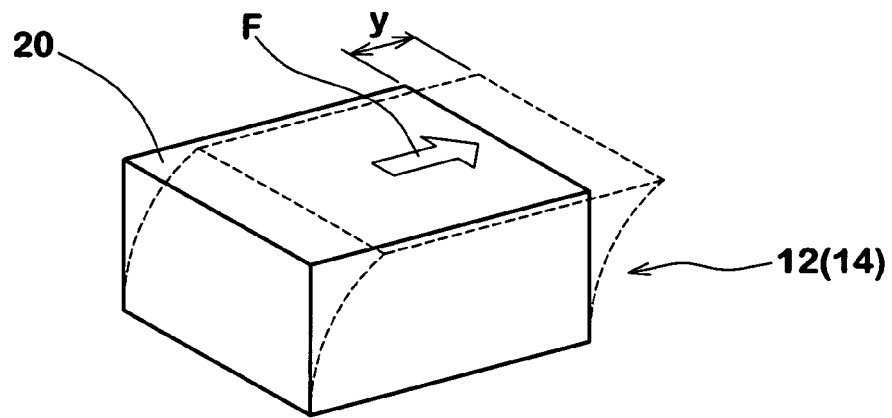
FIG. 6 is a diagram for explaining the circumferential rigidity of a block.

Incidentally, the circumferential rigidity Gi(=Gs, Gc) of a block (12, 14) is given by the following equation:

$$Gi = F/y$$

wherein, as shown in FIG. 6,

"F" is a tangential force in the tire circumferential direction which is applied to the ground contacting top face 20 of the block, and "y" is a resultant circumferential displacement of the top face 20.

Furthermore, in order to prevent uneven wear among the shoulder blocks, it is preferable that the ratio of the maximum circumferential rigidity Gs to the minimum circumferential rigidity Gs is less than 1.15. Also it is preferable that the ratio of the maximum circumferential rigidity Gc to the minimum circumferential rigidity Gc is less than 1.15 in order to prevent uneven wear among the crown blocks.

Figure 7:
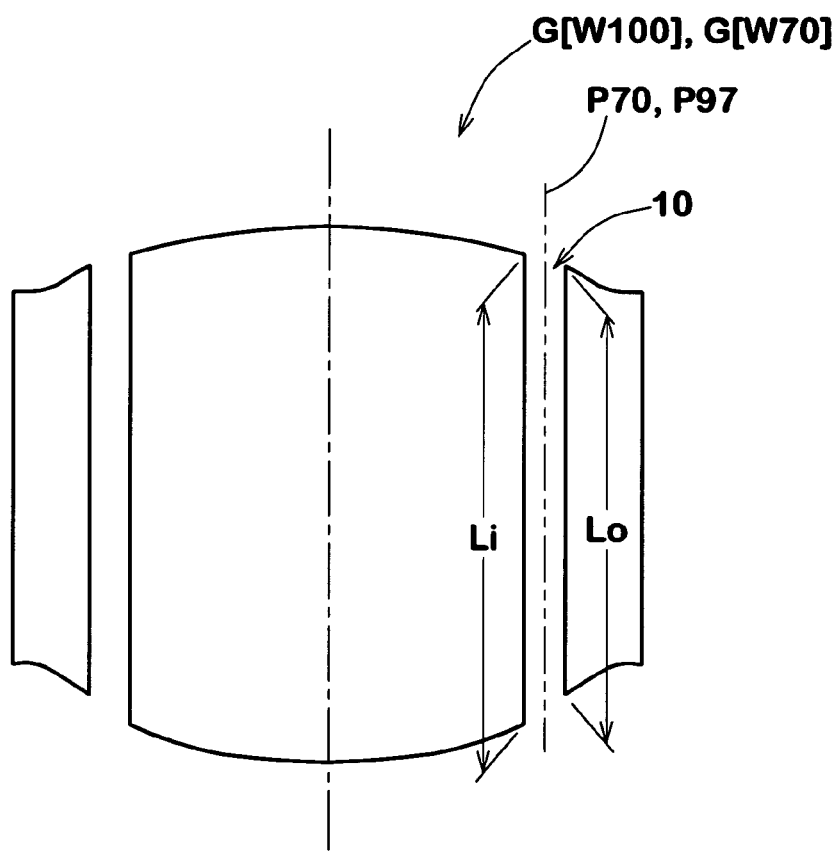
FIG. 7 is a diagram for explaining the ground contacting face.

In this embodiment, in order to provide the shoulder blocks 14 with sufficient rigidity, the outermost circumferential groove 10c is disposed axially inward of the position P70. However, if the circumferential groove 10 is stationary located at the position P70 or P97 during running as shown in FIG. 7, then the circumferential length L70 or L97 of the ground contacting face can be defined as the mean value of the circumferential lengths Li and Lo measured on both sides of the circumferential groove 10.

As explained above, as the tread portion is provided with the axial grooves, the foot print of the tire as shown in FIGS. 2 and 3 is ever-changing during running. However, when the foot print is evened off, a definite contour line as shown in FIG. 7 can be obtained. The ground contacting face G[W100], G[W70] is defined as having such contour line.

The tread pattern shown in FIG. 5 is mere an example. Various patterns can be employed in this invention. For example, the pattern in FIG. 5 is a point symmetry. Thus, the tread pattern in this embodiment is bidirectional. But, it is also possible that the tire has an unidirectional tread pattern, namely a line symmetry about the tire equator.

Comparison Test

Heavy duty radial tires of size 295/80R22.5 (Rim size 8.25×22.5) having the structure shown in FIG. 1 and tread patterns based on the tread pattern shown in FIG. 5 were made and tested for the wear resistance.

In order to change the ground contacting faces, mainly the carcass profile was changed as explained above. The radius Rc of curvature and the size of the region S having the radius Rc which were provided in the tire shoulder region are shown in Table 1.

In the wear resistance test, real test cars (2-D4 wheel-type, 25-ton trucks) mounted on the front wheels with the test tires (tire pressure 900 kPa) were run for 30,000 km (highway 20% and expressway 80%), and then the difference of the amount of wear of the shoulder blocks from that of the middle blocks was measured at six different circumferential positions to obtain their average. The results are shown in Table 1, wherein the inverse number of the average of the differences at the six measuring positions is indicated by an index based on comparative example 1 being 100. The larger the index number, the better the wear resistance.

TABLE 1

|  | Tire | | | | | | |
|---|---|---|---|---|---|---|---|
|  | Com. 1 | Com. 2 | Ex. 1 | Ex. 2 | Ref. 3 | Ex. 3 | Ref. 4 |
| Lengths of Ground contacting face | | | | | | | |
| L70[W100] (mm) | 223 | 225 | 220 | 221 | 218 | 220 | 224 |
| L97[W100] (mm) | 210 | 200 | 218 | 228 | 234 | 216 | 204 |
| L70[W100]/L97[W100] | 1.06 | 1.13 | 1.01 | 0.97 | 0.93 | 1.02 | 1.10 |
| L70[W70] (mm) | 155 | 144 | 150 | 150 | 148 | 152 | 157 |
| L97[W70] (mm) | 120 | 100 | 140 | 144 | 147 | 129 | 105 |
| L70[W70]/L97[W70] | 1.29 | 1.44 | 1.07 | 1.04 | 1.01 | 1.18 | 1.50 |
| L70[W70]/L97[W70] − L70[W100]/L97[W100] | 0.23 | 0.31 | 0.06 | 0.07 | 0.08 | 0.16 | 0.40 |
| Carcass profile in tire shoulder | | | | | | | |
| Radius Rc of curvature (mm) | 100 | 100 | 100 | 100 | 100 | 110 | 150 |
| Length of region S (mm) | 70 | 70 | 70 | 70 | 70 | 60 | 85 |
| Block rigidity ratio (Gs/Gc) | 1.70 | 1.70 | 1.70 | 1.70 | 1.40 | 1.68 | 1.40 |
| Resistance to Shoulder wear | 100 | 94 | 110 | 118 | 100 | 108 | 80 |

Figure 8:
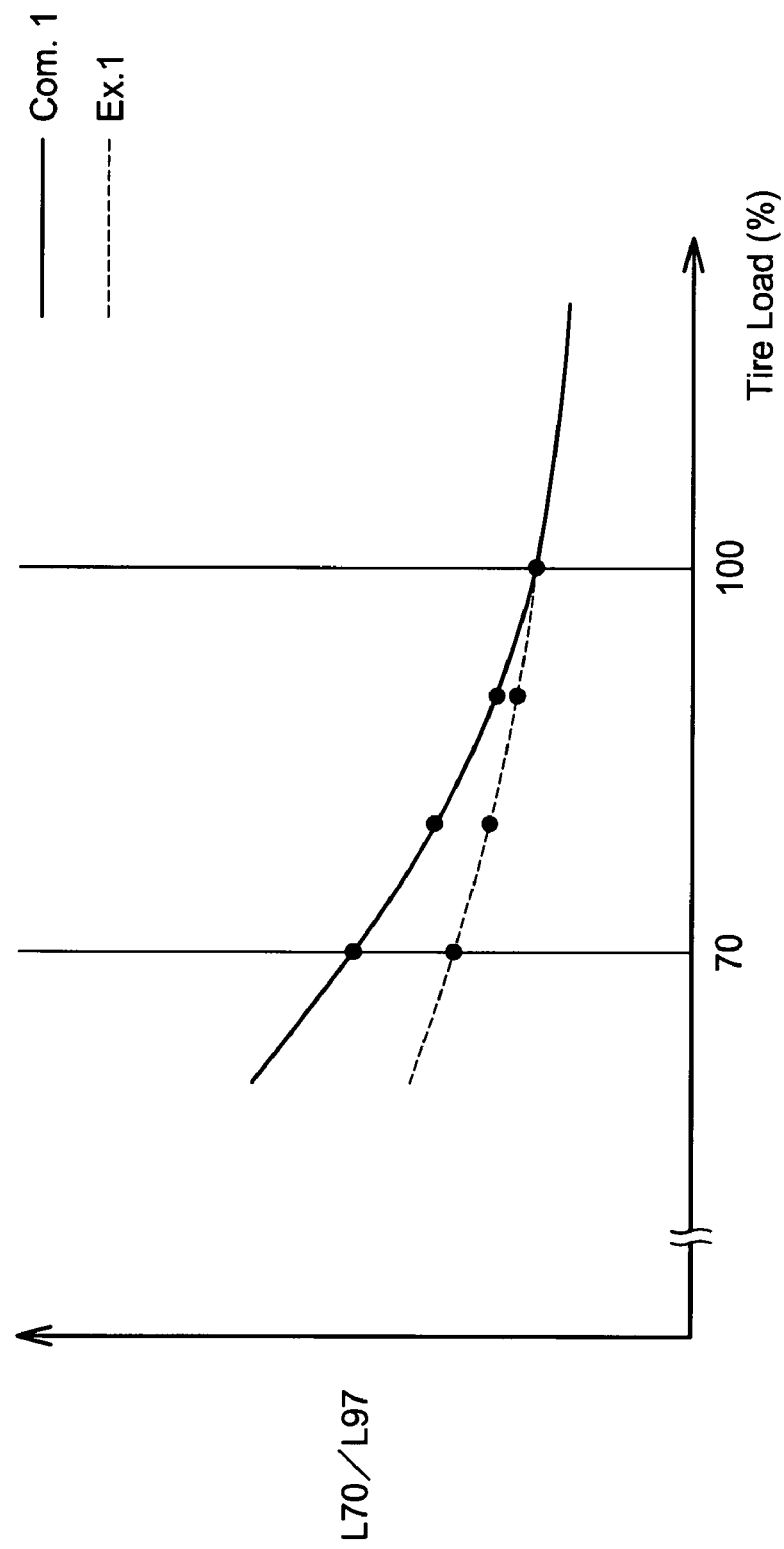
FIG. 8 is a graph showing the length ratio L70/L97 as a function of the tire load.
Figure 9:
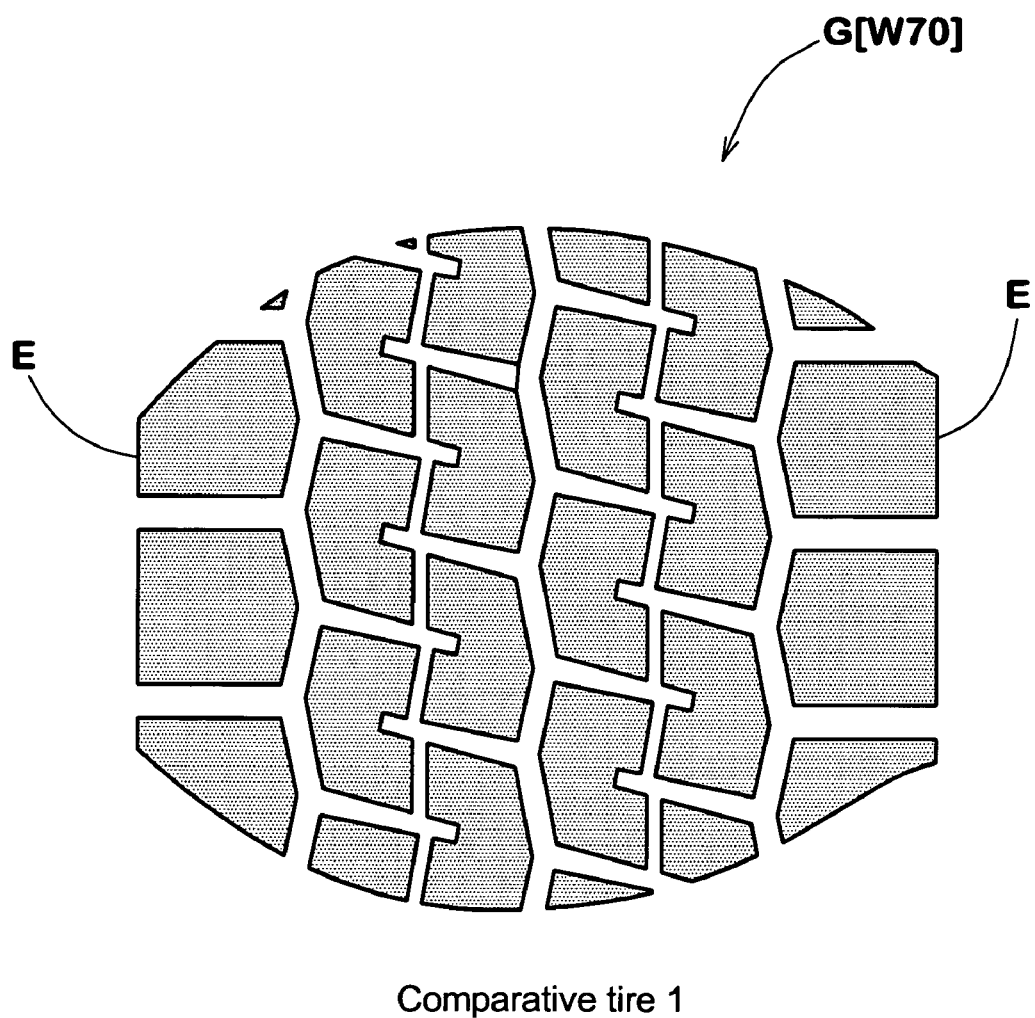
FIG. 9 shows the ground contacting face under the 70% pressure condition[W70] of a comparative tire used in the undermentioned comparative test.

FIG. 8 shows the ratio (L70/L97) between the circumferential lengths of the ground contacting face at the positions P70 and P97 as a function of the tire load. The comparative example 1 has, as shown in FIG. 9, a light-loading ground contacting face G[W70] whose circumferential length is gradually decreased from the tread center to the tread edges E, therefore, when the tire load is changed, the ratio (L70/L97) varies largely. In this case, as the shape of the ground contacting face changes largely, the ground contact pressure distribution also changes largely, and as a result, the wear in the tread shoulder region becomes increased. In the case of the inventive tire, contrary, the variation of the ratio (L70/L97) is relatively small, therefore, the ground pressure distribution is less changed and the shoulder wear can be effectively controlled.

Usually, heavy-duty tires are used with tire loads in a range of from 70 to 100% of the maximum tire load. Therefore, by optimizing the heavy-loading ground contacting face G[W100] and light-loading ground contacting face G[W70] as above, the shoulder wear can be certainly controlled. This was confirmed from the test results as shown in Table 1.

The invention claimed is:
1. A heavy-duty tire comprising
a tread portion,
a pair of sidewall portions,
a pair of bead portions,
a carcass extending between the bead portions through the tread portion and sidewall portions, and
a belt disposed radially outside the carcass in the tread portion,
wherein
when the tire is mounted on a standard wheel rim, inflated to a maximum pressure, and loaded with 100% of a maximum tire load,
the tread portion has a ground contacting face which has:
a circumferential length L97[W100] measured at a position P97[W100] spaced apart from the tire equator by an axial distance of 97% of one half of a ground contacting width TW[W100]; and a circumferential length L70[W100] measured at a position P70[W100] spaced apart from the tire equator by an axial distance of 70% of one half of the ground contacting width TW[W100],
when the tire is mounted on the standard wheel rim, inflated to the maximum pressure, and loaded with 70% of the maximum tire load,
the tread portion has a ground contacting face which has:
a circumferential length L97[W70] measured at a position P97[W70] spaced apart from the tire equator by an axial distance of 97% of one half of a ground contacting width TW[W70]; and
a circumferential length L70[W70] measured at a position P70[W70] spaced apart from the tire equator by an axial distance of 70% of one half of the ground contacting width TW[W70], and
the circumferential lengths L70[W100], L97[W100], L70[W70] and L97[W70] satisfy the following conditions:

$0.95 < L70[W100]/L97[W100] < 1.05$; and $1.03 < L70[W70]/L97[W70] < 1.20$, and in a 50%-pressure unloaded condition in which the tire is inflated to 50% of the maximum pressure and loaded with no tire load, a profile of the thickness center line of the carcass is provided in each shoulder region S with a single radius Rc of curvature of from 60 to 130 mm which is increased locally so that the radius Rc becomes decreased as the tire pressure increases to the maximum pressure, and the thickness center line in the 50%-pressure unloaded condition is positioned inside the thickness center line in a maximally-inflated unloaded condition in which the tire is inflated to the maximum pressure and loaded with no tire load, wherein the shoulder region S is positioned between an intersecting point X1 of a widthwise center line of an axially outermost circumferential groove with the carcass, and a point X2 positioned axially outwards of the intersecting point X1 by a length of from 40 to 70 mm along the thickness center line of the carcass.

2. The heavy-duty tire according to claim 1, wherein the circumferential lengths L70[W100], L97[W100], L70[W70] and L97[W70] further satisfy the following condition:

$0.05 < (L70[W70]/L97[W70] - L70[W100]/L97[W100]) < 0.23$.

3. The heavy-duty tire according to claim 1, wherein the tread portion is provided with crown blocks and shoulder blocks,
each of the crown blocks is defined as locating its centroid within a crown region which region is centered on the tire equator and has 60% of the tread ground contacting width under a maximally-inflated unloaded condition in which the tire is mounted on the standard rim and inflated to the maximum tire pressure but loaded with no tire load, and
each of the shoulder blocks is defined as locating its centroid within one of shoulder regions each defined as extending axially inwardly from one of tread edges by 17.5% of the ground contacting width under the maximally-inflated unloaded condition, and
the ratio (Gs/Gc) of a circumferential rigidity Gs of the shoulder blocks to a circumferential rigidity Gc of the crown blocks is in a range of from 1.50 to 2.00.

4. The heavy-duty tire according to claim 2, wherein the tread portion is provided with crown blocks and shoulder blocks,
each of the crown blocks is defined as locating its centroid within a crown region which region is centered on the tire equator and has 60% of the tread ground contacting width under a maximally-inflated unloaded condition in which the tire is mounted on the standard rim and inflated to the maximum tire pressure but loaded with no tire load, and
each of the shoulder blocks is defined as locating its centroid within one of shoulder regions each defined as extending axially inwardly from one of tread edges by 17.5% of the ground contacting width under the maximally-inflated unloaded condition, and
the ratio (Gs/Gc) of a circumferential rigidity Gs of the shoulder blocks to a circumferential rigidity Gc of the crown blocks is in a range of from 1.50 to 2.00.

5. The heavy-duty tire according to claim 1, 2, 3 or 4, wherein
when the tire is inflated to the maximum pressure and loaded with 100% of the maximum tire load, the ground contacting face has, at the tire equator, a circumferential length more than the circumferential length L97[W100] and the circumferential length L70[W100], and
when the tire is inflated to the maximum pressure, and loaded with 70% of the maximum tire load, the ground contacting face has, at the tire equator, a circumferential length more than the circumferential length L97[W70] and the circumferential length L70[W70].

* * * * *